June 20, 1967
L. J. MARTINO ETAL
3,326,692
METHOD OF AND APPARATUS FOR COOKING
Filed Sept. 14, 1964
3 Sheets-Sheet 1
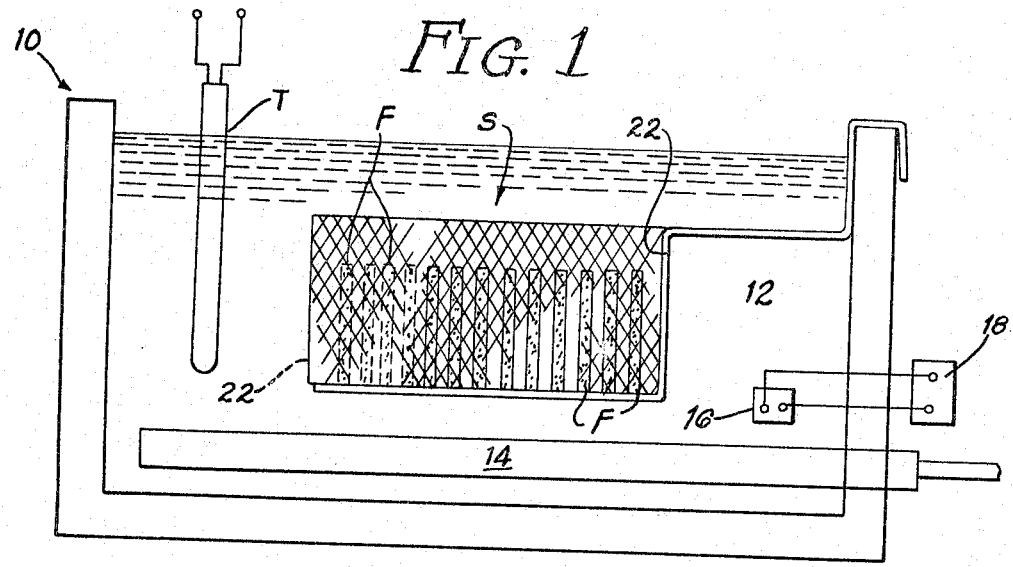
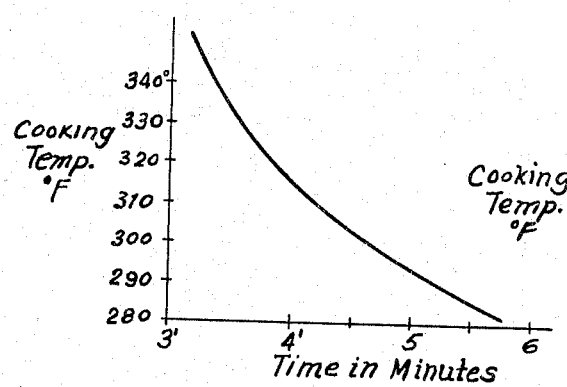
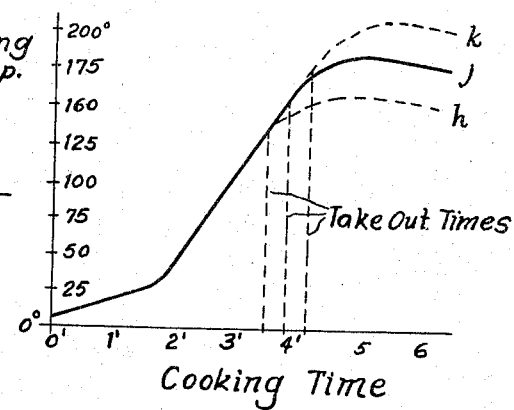
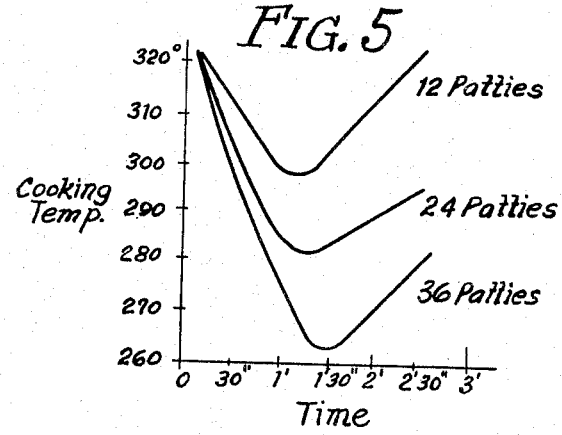
INVENTORS
Louis J. Martino
Herbert R. Blaese
By Horton, Davis,
Brewer + Brugman
Attys

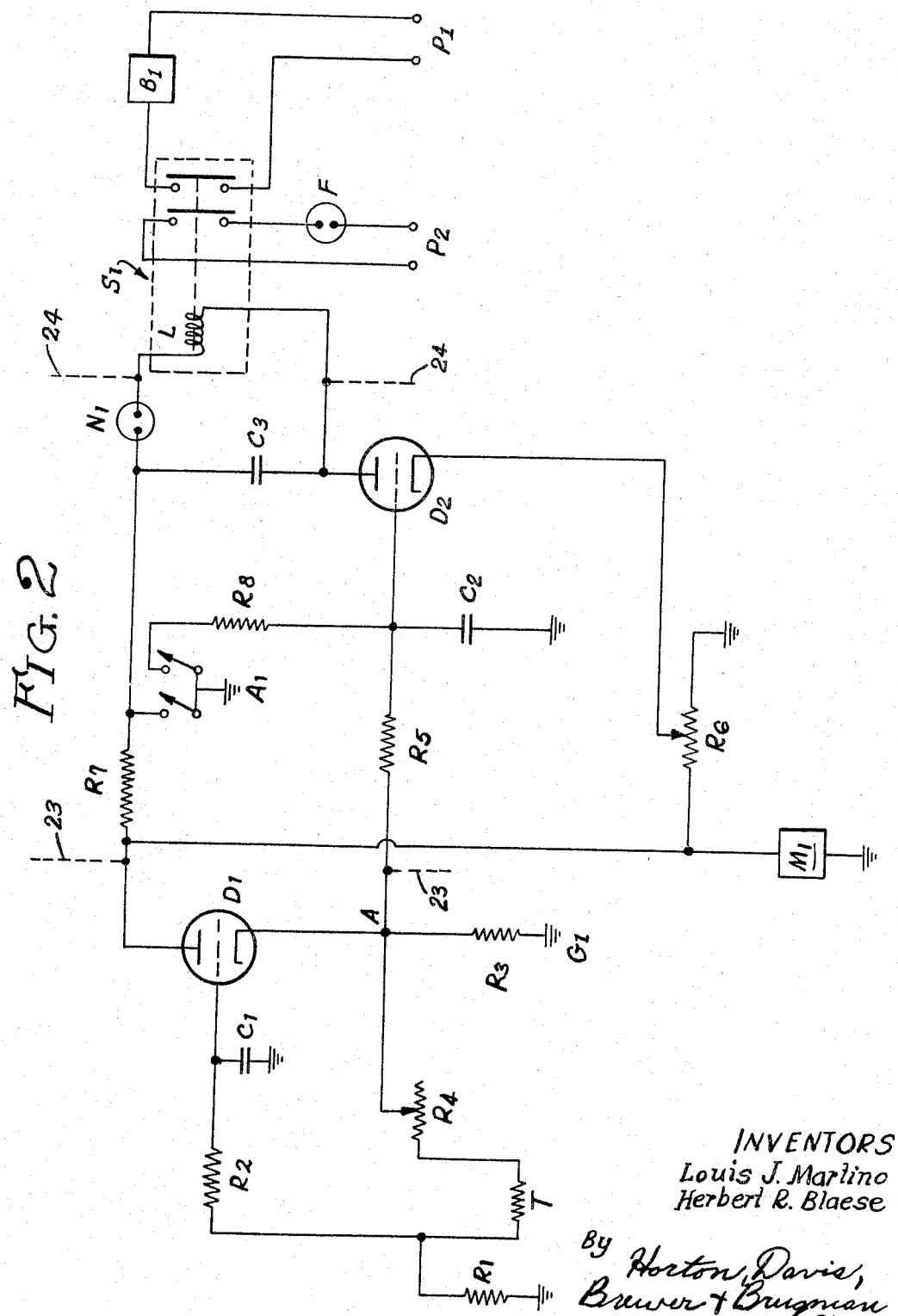

INVENTORS
Louis J. Martino
Herbert R. Blaese

By Horton, Davis,
Brewer + Burgman
Att'ys

United States Patent Office 3,326,692
Patented June 20, 1967

3,326,692
METHOD OF AND APPARATUS FOR COOKING
Louis J. Martino, Lombard, and Herbert R. Blaese, Chicago, Ill., assignors, by mesne assignments, to McDonald's Systems, Inc., Chicago, Ill., a corporation of Illinois
Filed Sept. 14, 1964, Ser. No. 396,072
16 Claims. (Cl. 99—111)

This invention relates in general to the art of cooking. It has more particular reference to a method of and apparatus for deep-fat frying or otherwise cooking foods to predetermined levels of doneness.

An object of this invention is the provision of a novel method of and apparatus for cooking products to desired levels of doneness notwithstanding temperature variations of a cooking medium during the cooking period or cycle of such products.

Another object of the invention is to provide such a method of and apparatus for automatically varying the duration of the cooking period of a product as a function of the temperature of the cooking medium even where that temperature varies during the cooking period.

It is a further object of this invention to provide a method of cooking food products having cooking rates which respectively vary as a function of the cooking temperature, wherein variations in the cooking temperature are sensed during the cooking period and are employed so to vary the duration thereof that the product is cooked to a predetermined level of doneness regardless of such variations in the cooking temperature during the cooking period of that product.

Yet another object of the invention is the provision of cooking means adapted uniformly to cook successive batches of a food or other product to a predetermined degree of doneness by automatically sensing during the cooking period of each batch variations in the cooking temperature to which the product is exposed and by automatically varying the duration of the cooking period of each batch as a function of the cooking temperature variations thereof whereby each batch may be removed from the cooking medium when that batch of the product has been cooked to its predetermined degree of doneness.

Other objects of this invention will become apparent from the following description which considered with the accompanying drawings discloses a preferred embodiment thereof.

In the drawings:

FIGURE 1 shows more or less diagrammatically a cooking or heating bath employed in the practice of the invention;

FIGURE 2 is a schematic wiring diagram of the presently preferred embodiment of the invention;

FIGURE 3 is a typical time-temperature curve applicable to the deep-fat frying of fish patties of a certain size to a predetermined level of doneness;

FIGURE 4 is a graph illustrative of variations in fish patty center temperatures as a function of cooking time at a typical bath or cooling medium temperature;

FIGURE 5 is a graph illustrative of variations in bath temperature as a function of the load or number of fish patties being cooked in the bath;

Figure 8:
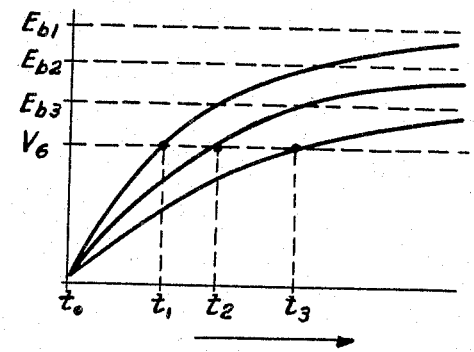
Figure 9:
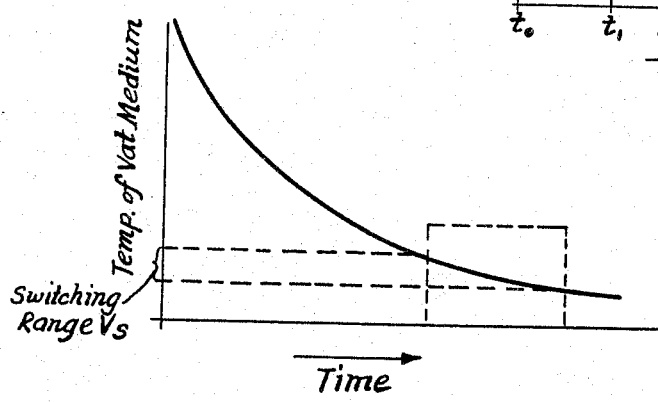

FIGURE 8 is a graph illustrative of the effect of voltage variations resulting from cooking medium temperature variations on the switching time of the timing means employed in the illustrated embodiment of the invention; and FIGURE 9 is a graph similar to that shown in FIGURE 3 and shows the relationship between the cooking medium temperature and the duration of the cooking period for attaining the desired degree of doneness internally and throughout fish patties of a certain size when cooked in accordance with the present invention.

In deep-fat frying, as in other cooking procedures, the product should be cooked or heat treated to a substantially exact degree or level of doneness, i.e., the degree desired to render it suitable for its intended purpose. Undercooking or overcooking for as little as a few seconds in the preparation of, for example, food makes a considerable difference in its palatability and may even cause it to be rejected as a food. It is also important that successive batches of such products be cooked to substantially the same degree so that the taste and palatability thereof will be substantially uniform as the result of the preparation of the successive batches.

Where a cook can and does carefully monitor the cooking process, it is possible that he will obtain an acceptable degree of doneness of a product being cooked. Even with careful monitoring it is, however, exceedingly difficult to cook a product substantially exactly to a desired degree of doneness and even more difficult to obtain uniformity of doneness in the preparation of succeeding batches of the product.

In drive-in restaurants and other high-speed restaurant operations, where uniformity is desirable and necessary, it is substantially impossible to obtain uniformly acceptably cooked products from batch to batch simply by cooking them for specified periods or simply by reliance upon monitoring the cooking process by a cook because the cooking medium temperature, as will be understood by those skilled in this art, will vary during each cooking period or cycle as a function of the size and nature of the products or batch being cooked, with the number of products or batches introduced in the cooking medium during a cooking period or cycle and with the temperature recovery period of the cooking medium, particularly where the variations in the cooking medium temperature are not the same during succeeding cooking periods or cycles.

According to this invention, the duration of each cooking period or cycle is automatically determined by the variations in the cooking temperature and the duration of each such temperature variation to which the batch is subjected while it is being cooked, whereby succeeding batches may be cooked to different predetermined degrees of doneness or some or all of them may be cooked to substantially the same predetermined degree of doneness.

Illustrative of the invention, a plurality of, for example, frozen fish patties are placed in a wire-mesh or other suitable basket which with its load is introduced into a liquid shortening or fat or other suitable cooking medium maintained at within a range of temperatures including a preset temperature for the deep-fat frying of those patties. The temperature of the bath or cooking medium, even without the presence of the fish patties or other products to be cooked, will vary significantly from the preset temperature due to imprecise temperature control means of the cooking medium. When the fish patties are introduced into the bath, the bath temperature decreases at a rate and to an extent, depending upon, among other things, the bath size, the patty load, and their relative temperatures.

It will thus be understood that cooking the patties for a specified time may not result in cooking them to a desired degree of doneness and will not insure a uniformly cooked product from batch to batch particularly where one or more other batches are introduced into the bath during the cooking period of a preceding batch therein.

The difficulty involved in cooking, for example, fish patties to a desired degree of doneness can better be appreciated when it is understood that cooking them for as little as 20 seconds more or less than, for example, a 4 minute cooking period, a factor of about 10%, may result in a substantially overcooked or undercooked product.

As already indicated the method and apparatus of this invention facilitate an accurate determination of the duration of a cooking period to enable cooking frozen fish patties or other products to a desired degree of doneness by continuously sensing variations in the cooking medium temperature and, in response to such temperature variations, automatically varying the duration of the cooking period to provide the desired degree of doneness. To that end means are provided for sensing variations in the temperature of the cooking medium and for converting the sensed temperature variations into correlative increments of electrical energy. Means responsive to those increments of electrical energy, and therefore to the sensed temperature variations of the cooking medium, is provided for integrating or totalizing the electrical energy increments during a cooking period whereby to time the cooking period as a function of the electrical energy increments, hence as a function of the temperature variations of the cooking medium. The means for thus timing the duration of the cooking cycle is employed to energize indicating means when the product has been cooked to a predetermined degree of doneness whereby to indicate the completion of the cooking period or cycle.

In the presently preferred embodiment of the invention a cooking bath includes as illustrated in FIG. 1 a vat or receptacle 10 containing a liquified shortening or other suitable cooking medium 12 adapted to be maintained at a cooking temperature by a gas fired or other suitable heating means 14. The heating means 14 is turned on and off in response to a usual temperature sensitive means 16 which is set to operate in a range of temperature variations determined by its sensitivity. The desired cooking temperature of the cooking medium 12 is chosen by a usual temperature selector 18 which is associated with the means 16 for predetermining and maintaining the desired temperature of the cooking medium. The means 14, 16, and 18 for maintaining temperature of the cooking medium within a given range when there are no products being cooked therein and for thereafter furnishing heat to the cooking medium when needed during a cooking period are well known and per se form no part of this invention. They, therefore, need no further description herein.

When there are no products in the cooking medium, its temperature may vary as much as about 20° F. When a food product, such as frozen fish patties F, in a wire-mesh or other suitable basket 22 is immersed in the cooking medium, the temperature of the cooking medium will drop and the heating means 14, under the control of the means 16 and 18, will tend to return the cooking medium temperature to the temperature predetermined by the setting of the selector means 18. The time required to return the cooking medium temperature to that predetermined value is sometimes called the recovery time.

As shown in FIG. 1 the food product is immersed at a cooking station S in the cooking medium which is remote from a thermistor or other suitable temperature sensing element T in the cooking medium. The electrical resistance of the thermistor T will thus change with and in response to variations in the cooking medium temperature. The thermistor T is located at a position in the cooking medium sufficiently remote from the cooking station S that it will continuously sense the cooking medium temperature and not the temperature of the fish patties themselves.

As shown in FIG. 2, the thermistor T is electrically connected in a thermister circuit powered by a suitable direct current source M1 of electrical energy. That circuit includes, in addition to the thermistor, impedance and amplifier means for providing electrical energy which varies with the electrical resistance of the thermistor T and hence with the temperature of the cooking medium and which is impressed on the input of the amplifier means to provide an amplified voltage which varies with the resistance of the thermistor and hence with the temperature of the cooking medium. That impedance means illustrated in FIG. 2 includes resistors R1, R2, and R3; variable resistor R4; and a condenser C1. That amplifier means includes a triode or other suitable vacuum tube D1.

The just mentioned voltage impressed on the input of the amplifier means is determined by the effective portion of the variable resistor R4, electrically connected with and between one terminal of the thermistor and a terminal A, in cooperation wtih the resistor R1, electrically connected with and between the other terminal of the thermistor T and ground. Resistance variations of the thermistor will produce or provide characteristic voltage variations across the resistor R1, the thermistor, and the effective portion of the variable resistor R4 for the temperature range to which the thermistor will be exposed in the cooking medium 12. The resulting voltage variations are impressed on the input circuit of the triode D1 to provide correspondingly varying amplified voltages between the terminal A and ground G1 in the output circuit of that triode.

An electrical potential at the terminal A with respect to ground G1 at any temperature to which the thermistor T is exposed in the cooking medium is provided and determined by the electrical energy supply source M1 and the grid potential of the triode D1. As the thermistor resistances varies with the cooking medium temperature, the grid potential of the triode D1 will also vary with that resistance and temperature resulting in correlative variations of the amplified potential at the terminal A with respect to ground G1. The amplified potential of the terminal A relative to ground G1 thus varies as a function of the cooking medium temperature as sensed by the thermistor T and is impressed across a condenser C2 and a resistor R5 for charging that condenser at a rate which will vary as a function of the cooking medium temperature.

The thermistor circuit resistances are adapted to provide for the thermistor circuit a characteristic consistent with the cooking curve for the product to be cooked which in the illustrated embodiment of the invention is fish patties of a certain size. The cooking curve as a function of time and temperature is shown in FIG. 3. The variable resistance R4 is adjusted to provide the thermistor circuit with a reference point on the cooking curve for the fish patties.

The thermistor circuit or computer section is thus adapted to provide an output voltage which is proportional to the cooking rate for the fish patties at the cooking medium temperatures to which the fish patties are exposed during the cooking period of cycle.

The condenser C2 is adapted to be charged through the limiting resistor R5 by the varying output voltage of the thermistor circuit and is in a timing circuit which is preferably powered by the electrical energy source M1 and which is adapted to determine the duration of the cooking period. In addition to the condenser C2 the illustrated timing circuit includes, as shown in FIG. 2, a resistor R7, a neon or other gas discharge tube N1, a coil L of an electrical relay S1 connected in series with the neon tube N1, a condenser C3 electrically shunting the series-connected tube N1 and coil L, a triode or other suitable vacuum tube D2, and a variable resistor R6.

As shown in FIG. 2, the condenser C2 is so connected to the input of the triode D2 as to control the conductivity between the plate and cathode thereof, whereby the triode will serve as an electrical valve or switch. The condenser C3 connected as shown in FIG. 2 will serve to trigger the neon tube N1, whereby to close the timing circuit through the relay coil L to operate means for indicating the termination of the cooking period.

Initially, the voltage across the condenser C2 is zero (0). Thereafter, as the cooking period proceeds, the output voltage of the thermistor circuit will cause the voltage charge of the condenser C2 to increase in the hereinafter explained manner, thus varying the grid bias of the triode D2. When the voltage charge of the condenser C2 increases to a predetermined values as hereinafter explained, it will so change the grid bias of the triode D2 tha the space between the plate and cathode thereof will become relatively highly conductive, as if a switch had been closed between those two elements of the triode D2. As that occurs, the source M1 begins to charge the condenser C3 through the effective portion of the variable resistor R6, the switched resistance of the plate-cathode space of the triode D2, and the resistor R7. In a predetermined time thereafter, i.e. when the voltage charge of the condenser C3 reaches the starting voltage of the neon tube N1, that condenser discharges through the neon tube and the coil L of the relay S1, thus energizing the relay coil to close relay contact means which control the operation of means for terminating or for indicating the termination of the cooking period.

The triode D1 is operated as a cathode follower in such a manner that a small voltage gain is effected for use in the timing circuit. Because of the amount of negative feedback that simultaneously exists in the circuit as shown in FIG. 2, a good order of stability is realized. The output of the triode D1 is a range of charging voltages for the resistance-capacity network including the resistor R5 and the condenser C2.

Figure 6:
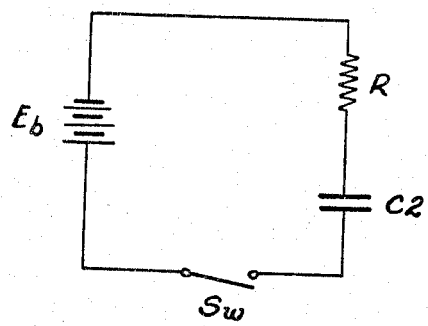
FIGURE 6 is a schematic wiring diagram of an elementary timing circuit shown to assist in understanding the timing means of the present invention.

In FIG. 6 an elementary resistance-capacity circuit is shown as including a battery adapted to provide a voltage $E_b$, a resistor R, a condenser C2, and a switch $Sw$. Before the switch $Sw$ is closed the condenser C2 is in an uncharged state. After the switch $Sw$ is closed, the voltage $e_c$ across the condenser C2 obeys the equation $$e_o = \left(1 - \frac{1}{\epsilon^t}\right) E_b$$

wherein the symbol $\epsilon$ as used herein and hereinafter is the natural logarithm and its exponent $t$ is the time during which the voltage $E_b$ is applied to the condenser C2 in the illustrated circuit. The graph of that equation is shown in FIG. 7.

Figure 7:
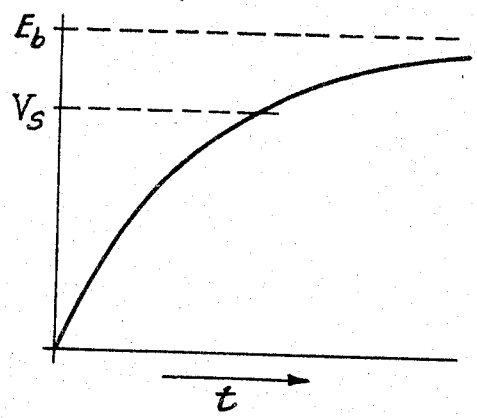
FIGURE 7 is a graph illustrative of the timing function of the circuit shown in FIGURE 6.

In the schematic wiring diagram of FIG. 2, the source voltage designated $E_b$ in FIGS. 6 and 7 is the cathode-to-ground voltage of the triode D1 or, in other words, the potential of terminal A with respect to ground G1. That voltage, as already pointed out, is proportional to the cooking medium temperature in the vat or receptacle 10. Various values of that voltage are shown in the graph of FIG. 8 as $E_{b1}$, $E_{b2}$ and $E_{b3}$. $E_{b3}$ in FIG. 8 represents a voltage resulting from a low cooking medium temperature. In FIGS. 7 and 8 $Vs$ represents the time spreading voltage and is a predetermined value of charge of the timing condenser C2. It is based upon the effective range of variations of the source voltage $E_b$ or, in FIG. 2, the output voltage of the thermistor circuit.

From a consideration of FIGS. 7 and 8 it will be appreciated that if $Vs$ is is constant and $Eb$ varies, then conversely if $Eb$ is constant, $Vs$ may be considered as varying according to temperature and as useful in determining the switching voltage of the triode D2. It will thus be understood that as the time spreading voltage or switching voltage $Vs$ of the triode D2 is by design made to approach any value of the voltage $Eb$, the cooking period is lengthened non-linearly and follows the doneness curve of FIG. 3.

The novel electrical timing means is adapted to effect consistently a predetermined degree of doneness to the product being cooked. It has been found that if the internal portion of the product reaches a predetermined temperature, the doneness throughout that product can be accurately controlled by regulating the cooking period in accordance wth the variations in the cooking medium temperature within a usual range of cooking temperatures of that product. It has been found experimentally that for such predetermined internal temperatures to result in throughout doneness of products to be cooked, the cooking period as a function of cooking medium temperature may be expressed by the equation $$\epsilon^t = \frac{a}{T}$$

wherein $a$ represents the predetermined internal temperature of the product which may result in throughout doneness thereof and which is a constant for each product to be cooked; $t$ represents the duration of the cooking period; and T represents the cooking medium temperature. FIG. 9 is a graphical representation of that equation showing the doneness curve of FIG. 3 applied thereto. As will be seen in FIG. 9 the doneness curve of FIG. 3 for deep-fat frying of fish patties of a certain size coincides with that portion of the curve plotted in FIG. 9 from the equation $$\epsilon^t = \frac{a}{T}$$

indicated by the broken line rectangle in FIG. 9.

When the discharge potential of the condenser C3 is reached it triggers the neon tube N1 which makes the circuit through the coil L of the relay S1. The contacts of the relay S1 are thus closed to control one or more signalling circuits including a buzzer B1 or other suitable audible indicating means to indicate that it is time to remove the fish patties from the cooking medium. In addition or alternatively, a light or other visual means F, flashing or otherwise, may be actuated by the relay coil L for further indicating that the fish patties should be removed from the cooking medium. It will be understood that other means for indicating the termination of the cooking period may be substituted for one or both of the indicating means B1 and F. For example, well known means for automatically elevating the fish patties or other products being cooked to remove them from the cooking medium may be utilized to remove the product from the cooking medium upon the termination of the cooking period in response to the discharge of condenser C3. Suitable energy sources are provided to power the indicating means B1 and F and are indicated as P1 and P2 respectively in FIG. 2.

When it is desired to de-activate the indicating means, a start-stop switch A1 is closed. The closing of that switch short-circuits or grounds the condenser C2 through a resistor R8 and the switch A1 and short-circuits the neon tube N1 relay coil L, condenser C3, and triode D2, and causes the opening of the contacts of relay S1. As long as the switch A1 is closed neither the condenser C2 nor the condenser C3 will be subjected to a charging voltage in the circuit shown in FIG. 2.

To use the apparatus of FIG. 2, the thermistor T is placed in the cooking medium 12. When the cooking medium is heated to the temperature range determined by the setting of the means 14, 16 and 18 and the thermistor and timing circuits are adjusted for the fish patties or other food products to be cooked, a load or batch of the fish patties in the basket 22 is immersed in the cooking medium. The power sources for those and the indicating circuits and for the heating of the cathodes of the triodes D1 and D2 having been turned on by appropriate control switch means (not shown), the start-stop switch A1 is opened substantially simultaneously with the immersion of the fish patties in the cooking medium. The apparatus will then operate as hereinabove described and when the condenser C3 discharges, the indicating means will operate to indicate termination of the cooking period or cycle for cooking the fish patties to the desired doneness.

In deep-fat frying operations one or more batches, two being shown in FIG. 1, are sometimes immersed in the cooking medium. When a second batch is introduced into the cooking medium during the cooking period of another batch, the cooking medium temperature will drop significantly. The novel apparatus of the present invention is adapted automatically to vary the cooking period of each batch in accordance with and in response to the cooking medium temperature variations to which each batch is subjected by the cooking medium, whether such temperature variations are caused by the introduction into the cooking medium of another batch during the cooking period of a batch previously immersed in the cooking medium or by other causes, whereby each of those batches will be subjected to a cooking period of sufficient duration to provide a uniform degree of doneness to the fish patties in the various batches.

To that end another timing circuit substantially identical to that shown in FIG. 2 may be electrically connected in parallel therewith at the terminals designated by the reference character 23. In such a case the output voltage of the single thermistor circuit is impressed on the control condenser C2 for each of the timing circuits. The characteristics and components of the second timing circuit will be substantially the same as those of the timing circuit shown in FIG. 2 and the two timing circuits will operate completely independently of each other in response to the cooking medium temperature. Each timing circuit will have a start-stop switch A1 and associated circuitry and may (as shown) control separate indicating means for indicating which of the timing circuits has completed the determination of the cooking period for a product being cooked. The separate indicating circuit substantially identical to that shown in FIG. 2 may be electrically connected in parallel therewith at the terminals designated as 24.

The timing and thermistor circuits are calibrated to provide the variable cooking period for the particular product to be cooked and the degree to which that product is to be cooked, FIG. 3 showing the cooking curve for fish patties and being illustrative of the non-linear cooking curve for other food products.

FIG. 4 graphically illustrates the importance of accurately relating the varying temperatures of the cooking medium to the cooking time. In the case of fish patties of a certain size the temperature at the center of each patty gradually rises as it is being cooked. If the patty is removed about 20 seconds too soon (line $h$) in a desired cooking period of 3 minutes and 50 seconds (line $j$), the center temperature of the patty will be about 25° below the desired center temperature resulting in substantial undercooking. If the patty is removed about 20 seconds too late (line $k$), the center temperature will rise about 25° above the desired center temperature of the patty resulting in substantial overcooking.

From FIG. 4 it will be noted that the fish patties continue to cook after they have been removed from the cooking medium, due to a heat transfer from the hotter outer surfaces to the relatively cooler interiors, until the temperature throughout the patty is equalized. When the expression "proper or predetermined level or degree of doneness" or similar expressions are used herein they relate to the appropriate exposure to the cooking medium for providing a product which when removed from the cooking medium promptly at the end of the cooking period will be properly cooked even though part of the actual cooking may occur after the product has been removed from the cooking medium.

FIG. 5 illustrates the significant variations in bath temperatures which can occur in a cooking medium, such as a Keating 55,000 B.t.u. fryer, when varying loads of frozen fish patties substantially uniform in size are immersed in a cooking medium which has been heated to a temperature of 325° F. For example, during the first 2½ minutes of a cooking cycle for twenty-four patties the temperature varies in a range between about 325° F. and about 280° F. With the method and apparatus of this invention the cooking cycle is continuously and automatically adjusted and varied to compensate for such temperature variations in a manner proportional to the characteristic non-linear curve of FIG. 3 of the fish patties.

While it is clear that the values for the various components of a timing apparatus of this invention will vary with the characteristics of the product to be cooked and with the characteristic cooking rate or curve of that product, for frozen fish patties approximately 3¼" x 2½" x ½" to be cooked to an ultimate center temperature of about 180° F. in a deep-fat frying bath operating in a temperature range between about 260° F. and 350° F. where optimum average bath temperatures vary between about 280° F. and 350° F., components may have the following characteristics and values:

A suitable thermistor T providing a resistance of 58,400 ohms at 310° F. is one manufactured by Fenwal Electronics Inc., Framingham, Mass., and designated as GA71P1B.

| | |
|---|---|
| Resistance R1 | 470,000 ohms. |
| Resistance R2 | 1.2 megohms, 1,200,000 ohms. |
| Resistance R3 | 60.4K (1%), 60,400 ohms. |
| Resistance R4 | A 15,000 ohm (5%) resistance between the thermistor and a variable 20,000 ohm resistance. |
| Capacitance C1 | 0.01 mfd. |
| Capacitance C2 | 8 mfd. |
| Capacitance C3 | 1 mfd. |
| Resistance R5 | 30.0 (1%) megohms. |
| Resistance R6 | From power supply to ground, 220,000 ohms (5%), 10,000 ohms variable resistance, and 51,000 ohms (1%). |
| Resistance R7 | 100,000 ohms. |
| Resistance R8 | 100 ohms. |
| Triode D1 | A 5814 tube having a direct current plate potential of 300 volts. |
| Triode D2 | A 5751 tube having a plate potential of 300 volts direct current (v. D.C.) and a cathode potential of 60 v. D.C. |
| Neon tube N1 | A neon tube having a triggering level of between 170 v. D.C. and 200 v. D.C. |

With the exemplary thermistor used with the exemplary component values listed, the output voltage of the thermistor circuit at terminal A and the thermistor resistance at certain temperature levels are illustrated in Table 1 with respect to the cooking times for the particular frozen fish patties in a deep-fat bath.

TABLE I

| Temperature | Output Voltage, volts | Cooking Time | Thermistor Resistance, kiloohms |
|---|---|---|---|
| 330 | 100 | 3'37" | 43.5 |
| 310 | 91 | 4'15" | 58.4 |
| 270 | 70 | 7'15" | 113.6 |

As has been noted specific reference to the deep-fat frying of frozen fish patties has been made to exemplify the present invention. The invention is of broader utility and the method and means thereof may be used to secure the proper cooking of other products as well without departing from the true scope and spirit of the invention.

We claim:
1. A method of deep-fat frying fish patties to a proper degree of doneness, comprising the steps of heating a deep-fat frying bath to a temperature of from about 280° F. to about 350° F., immersing frozen fish patties in said deep-fat frying bath thereby reducing said bath temperature, maintaining said deep-fat frying bath at a temperature between about 260° F. and about 350° F. while said fish patties are immersed therein, continuously sensing the temperature level of said bath, electrically totalizing the time-temperature relationships of said bath during a frying period, producing a signal when said time-temperature relationships have reached a predetermined value, then in response to said signal, removing said fish patties from said bath.

2. In the art of uniformly cooking successive loads of fish patties to a proper degree of doneness in a bath heated to an elevated temperature and in which the bath temperature varies during a cooking period, the method comprising immersing a load of said fish patties in a heated bath, continuously sensing the temperature level of said bath at a point remote from said fish patties, continuously converting the sensed temperature levels into electrical potentials proportional to the sensed temperature levels, continuously integrating said electrical potentials until the sum of said electrical potentials reaches a predetermined value, then removing said fish patties from said bath in response to an indication that said predetermined value has been reached.

3. A method of deep-fat frying fish patties to a proper degree of doneness by continuously integrating the temperature level of a deep-fat bath for an extended period of time during which the temperature of said bath varies, comprising the steps of immersing said fish patties in said deep-fat bath, continuously sensing the varying temperature levels of said bath at a point in said bath remote from said immersed fish patties, electrically integrating the sensed temperature levels of said bath for an extended period of time until the sum of the integrals reaches a preselected value at which a proper degree of doneness of said fish patties has been reached, then indicating that said preselected value has been reached.

4. In the art of deep-fat frying food products immersed in a deep-fat bath in which an accurate determination of the proper degree of doneness is desirable so that the food product may be removed when it has been properly cooked, the method comprising continuously electrically sensing the temperature of the bath from the time the food product is immersed in said bath, continuously integrating the sensed time-temperature relationship of said bath from the moment the food product is immersed in said bath indicating the sum of the sensed time-temperature relationship, and removing said food product in response to the indicated sum.

5. In the art of uniformly cooking successive batches of a food product immersed in a continuously heated medium maintained at temperature levels greater than ambient temperature, in which said batches of immersed food products are cooked for an extended period of time until they reach a proper degree of doneness and are then removed from said continuously heated bath, the method comprising immersing a batch of said food product in said continuously heated medium, continuously sensing the temperature level of said medium which varies while said food product is immersed therein, electrically integrating as a function of time, the varying temperature levels of said continuously heated medium while said food product is immersed therein until the sum of the integrals reaches a preselected value at which said food product has reached said proper degree of doneness, then indicating that the preselected value has been reached so that said food product may be removed from said medium.

6. Apparatus for uniformly cooking successive batches of a food product to a proper degree of doneness in a cooking medium having a regulatable heating source for heating said medium, the combination comprising a cooking vat for containing a cooking medium, an electrical temperature sensing element submersible in said medium at a point remote from a submersion station for said food product for sensing the varying temperature levels in said medium at said point during a cooking cycle, means responsive to said temperature sensing element for integrating the sensed temperature levels at said point as a function of time during said cooking cycle until the sum of said sensed temperature levels reaches a predetermined value, and means responsive to said integrating means for indicating when said predetermined value has been reached.

7. In combination, a cooking bath having a cooking station in which successive batches of a product are immersed and are to be cooked to a uniform predetermined degree of doneness and wherein the temperature of said cooking bath varies during each cooking cycle, and control means comprising a temperature sensing element submersible in said bath at a point spaced from said cooking station and continuously responsive to variations in the temperature of said bath at said point, electrical totalizing means operatively connected to said temperature sensing element for variably timing a cooking cycle in a predetermined manner as a non-linear function of the varying temperatures of said bath at said point during said cooking cycle, and indicating means responsive to said totalizing means at a predetermined condition thereof for indicating when a cooking cycle has been completed whereby said product may be removed from said cooking bath.

8. In apparatus for cooking products to a predetermined degree in a cooking bath having a regulatable heating source for maintaining said cooking bath at elevated temperatures the combination comprising a cooking bath having a cooking station therein, a temperature responsive element submersible at a point in said cooking bath for sensing the varying temperature level of said bath at said point, said temperature responsive element having an output which varies as a function of the varying temperature level of said bath, electrical totalizing means responsive to the variable output of said temperature responsive element for timing a cooking cycle for a product immersed in said bath, as a function of the varying temperature levels sensed during a cooking cycle, and indicating means responsive to said totalizing means for indicating when said cooking cycle has been completed.

9. In combination with a heated cooking bath in which a food product submersible therein is to be cooked to a predetermined level of doneness and in which the rate of cooking varies non-linearly as a function of the varying temperature levels in said bath during a cooking cycle, control means for sensing when said food product has been cooked to a predetermined degree of doneness thereby indicating that a cooking cycle has been completed, said control means comprising a temperature sensitive element submersible in said bath and providing an electrical output potential which varies in a preselected manner with the varying temperature levels of the bath, electrical timing means chargeable at rates which are a function of the output potential of said temperature sensing element and which are dischargeable at a predetermined elevated potential, and means responsive to the discharge of said electrical timing means for indicating that said cooking cycle has been completed whereby said food product may be removed from said cooking bath.

10. In apparatus for cooking successive batches of a food product immersed in a heated cooking bath at a cooking station to a predetermined uniform degree of doneness, the means comprising a thermistor submersible in said bath at a point remote from a cooking station, means for translating the thermistor potentials which vary in a predetermined manner with the temperature of said bath into a second variable potential, first electrical capacitance means responsive to said second variable potential and chargeable at rates proportional to said second variable potential, second capacitance means chargeable when said first capacitance means reaches a predetermined potential, said first and second capacitance means being proportioned to cause said second capacitance means to discharge when said food product has reached a predetermined level of doneness, and means responsive to the discharge of said second capacitance means for indicating that said predetermined level of doneness has been reached so that food product may be removed from said bath.

11. In apparatus for uniformly cooking food products to a predetermined degree of doneness in a heated cooking bath maintained at elevated temperatures and having a cooking station therein for said food products, thermistor means submersible in said cooking bath at a point remote from said cooking station, a thermistor circuit balanced to give an output potential which varies in a preselected manner with variations in thermistor potential, the variations in thermistor potential varying with the incremental temperature levels of said bath at said point, a timing means responsive to the output potential of said thermistor circuit, said timing means including capacitance means chargeable at a rate which varies with the output potential of said thermistor circuit and which is dischargeable when said capacitance means has reached a preselected potential corresponding to the time at which said food product should be removed from said bath, and means responsive to the discharge of said capacitance means for indicating that said preselected potential has been reached.

12. In apparatus for cooking a product in a heated cooking medium having a cooking station therein to a predetermined level of doneness whereby the end of a cooking cycle may be determined, the combination comprising an electrical temperature responsive element for sensing the temperature of a cooking medium at a point therein, the electrical characteristics of which element vary with variations in the sensed temperature level of said medium, integrating means responsive to the varying electrical characteristics of said temperature responsive element for sensing when said food product has reached said predetermined level of doneness, and means operable in response to said integrating means for indicating when said food product has reached said predetermined level of doneness.

13. In combination with a heated cooking bath maintained at elevated temperatures and having a cooking station therein at which a food product may be submerged, means for timing a cooking cycle for said food product as a function of the varying temperature levels in said bath during said cooking cycle, said means comprising an electrical temperature sensitive element immersed in said bath at a point remote from said cooking station, circuit means for said temperature sensitive element for converting variations in the bath temperature into an output potential which varies as a function of the bath temperature, means responsive to said variable output potential for timing the exposure of said food product to said bath as a function of said bath temperature variations during said cooking cycle, and means responsive to said timing means for indicating when said cooking cycle has been completed so that said food product may be removed from said bath.

14. In the art of uniformly cooking successive loads of a food product to a proper degree of doneness in a bath heated to an elevated temperature and in which the bath temperature varies during a cooking period, the method comprising immersing a load of said food product in a heated bath, continuously sensing the temperature level of said bath at a point remote from said food product, continuously converting the sensed temperature levels into electrical potentials proportional to the sensed temperature levels, continuously integrating said electrical potentials until the sum of said electrical potentials reaches a predetermined value, then removing said fish patties from said bath in response to an indication that said predetermined value has been reached.

15. A method of cooking a product to a selected condition in a heated cooking medium that varies in temperature during a cooking cycle, said method comprising immersing a load of said product in said medium, sensing the instantaneous temperature at a region of said medium while said product is immersed in said medium, repeatedly producing an electrical signal instantaneously proportional to the sensed temperature, totalizing the cooking effect of said medium on said product by integrating the signal as a function of time while said product is immersed in said medium, producing an indication representative of the totalized cooking effect of said medium on said product, and removing the product from said bath when a selected totalized cooking effect is indicated.

16. In combination, heated bath means for maintaining a cooking medium at an elevated temperature range for cooking a food product immersed in said medium, sensing means responsive to the temperature at a region of said medium to provide repeated output signals that vary in proportion to temperature of the medium at said region, and electrical integrating means responsive to said output signals to totalize said output signals to produce a utilization signal representative of the totalized cooking effect of said medium on said food product.

References Cited
UNITED STATES PATENTS 2,657,580   11/1953   Schroeder _____ 73—362
3,186,228   6/1965   Lever et al. _____ 73—362

A. LOUIS MONACELL, *Primary Examiner.*

L. M. SHAPIRO, *Assistant Examiner.*